US008416670B2

United States Patent
Kim et al.

(10) Patent No.: US 8,416,670 B2
(45) Date of Patent: Apr. 9, 2013

(54) METHOD OF ACCESSING OPTICAL RECORDING MEDIA, OPTICAL PICKUP DEVICE, AND OPTICAL DRIVE USING THE DEVICE

(75) Inventors: Ui-yol Kim, Suwon-si (KR); Yong-jae Lee, Suwon-si (KR); Pyong-yong Seong, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 199 days.

(21) Appl. No.: 12/891,072

(22) Filed: Sep. 27, 2010

(65) Prior Publication Data

US 2011/0075535 A1    Mar. 31, 2011

(30) Foreign Application Priority Data

Sep. 30, 2009    (KR) ................ 10-2009-0093217

(51) Int. Cl.
*G11B 7/135* (2012.01)
(52) U.S. Cl. .............. 369/112.23; 369/47.49; 369/94
(58) Field of Classification Search ............... 369/47.49, 369/94, 112.01, 112.23
See application file for complete search history.

(56) References Cited

U.S. PATENT DOCUMENTS

| 7,280,445 B2 * | 10/2007 | Funakoshi | 369/44.25 |
| 7,586,826 B2 * | 9/2009 | Park et al. | 369/112.1 |
| 2005/0018560 A1 * | 1/2005 | Kim et al. | 369/44.37 |
| 2005/0083813 A1 * | 4/2005 | Ogasawara | 369/53.2 |
| 2005/0135218 A1 * | 6/2005 | Akiyama et al. | 369/112.02 |
| 2006/0002250 A1 * | 1/2006 | Shirota et al. | 369/44.27 |
| 2006/0203302 A1 * | 9/2006 | Hendriks et al. | 358/484 |
| 2007/0133372 A1 * | 6/2007 | Hirai | 369/112.01 |
| 2007/0263522 A1 * | 11/2007 | Yamamoto et al. | 369/112.23 |
| 2008/0074976 A1 * | 3/2008 | Nishikawa et al. | 369/53.17 |
| 2008/0175123 A1 * | 7/2008 | Looijmans et al. | 369/94 |
| 2008/0219131 A1 * | 9/2008 | Hendriks et al. | 369/112.23 |
| 2009/0034388 A1 * | 2/2009 | Nakano et al. | 369/94 |
| 2009/0147650 A1 * | 6/2009 | Yanagawa et al. | 369/94 |

FOREIGN PATENT DOCUMENTS

KR    10-2007-0116931 A    12/2007

OTHER PUBLICATIONS

Korean Office Action mailed Dec. 13, 2012, issued in counterpart Korean Patent Application No. 10-2009-0093217; 5 pages in Korean language.

* cited by examiner

*Primary Examiner* — Wayne Young
*Assistant Examiner* — Brenda Bernardi
(74) *Attorney, Agent, or Firm* — NSIP Law

(57) ABSTRACT

An optical pickup device corresponding to an optical recording medium having a plurality of recording layers, and an optical drive using the device are provided. The optical pickup device includes a collimator lens disposed between an object lens and a light source. The collimator lens adjusts a focal length with respect to the optical recording medium, and the object lens focuses light passing through the collimator lens, on the optical recording medium. The object lens is optically optimized for an upper or second-upper recording layer of the optical recording medium.

19 Claims, 7 Drawing Sheets

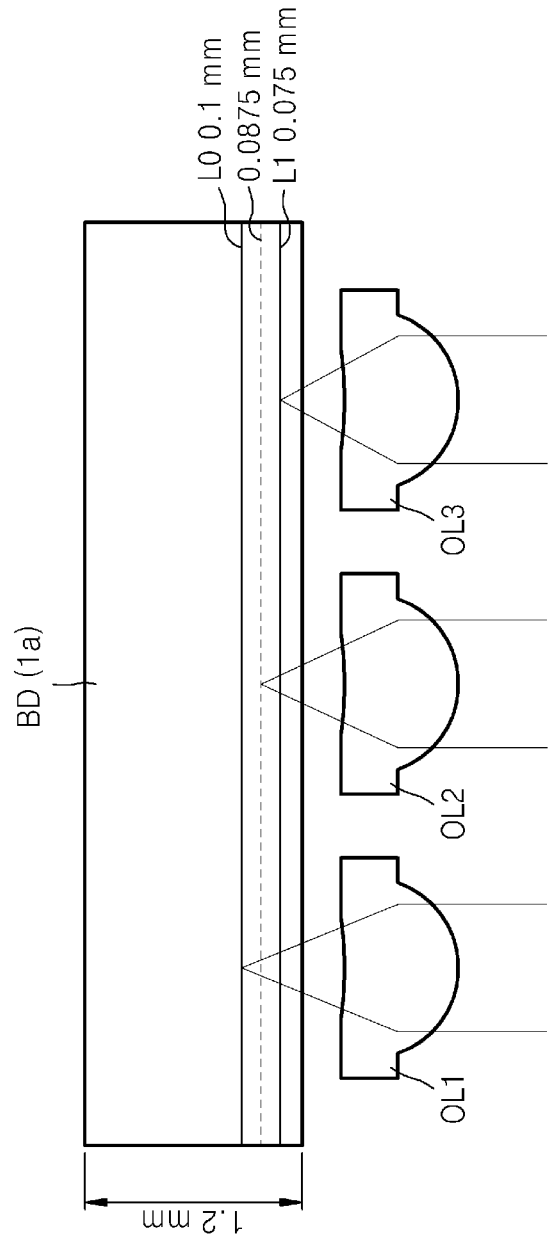

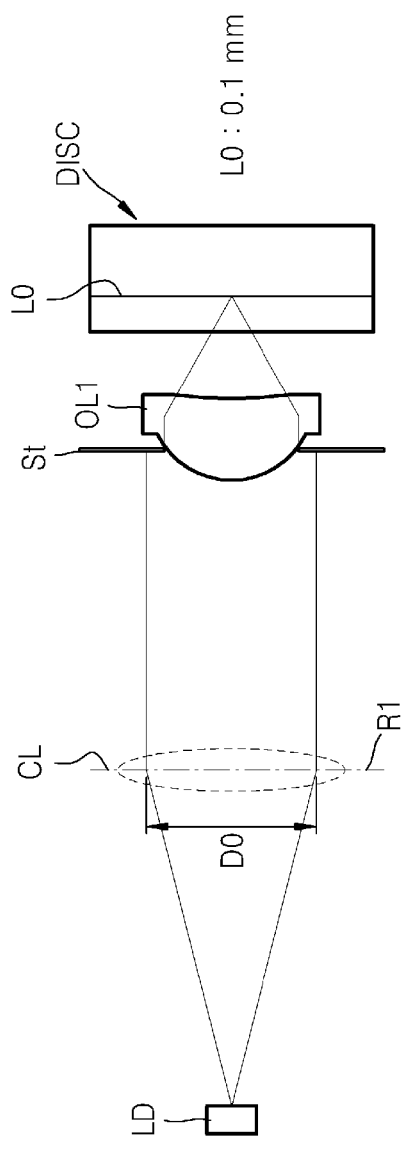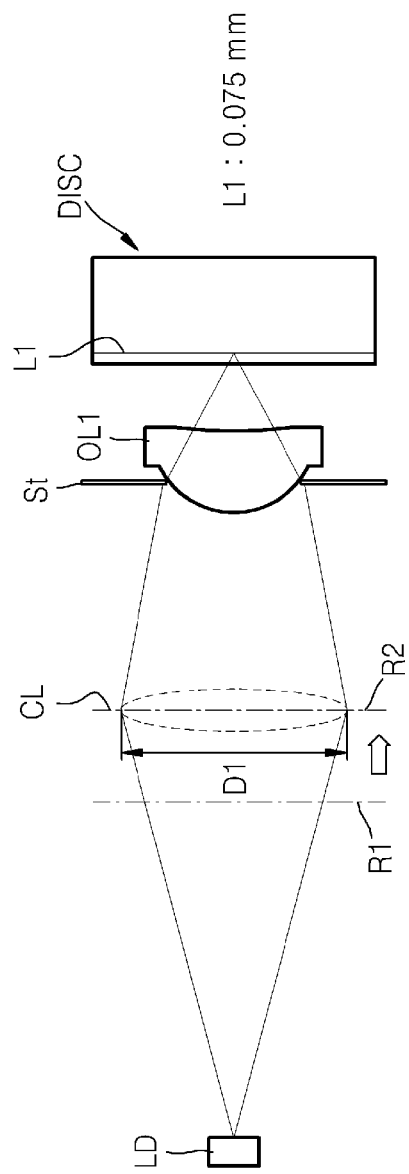

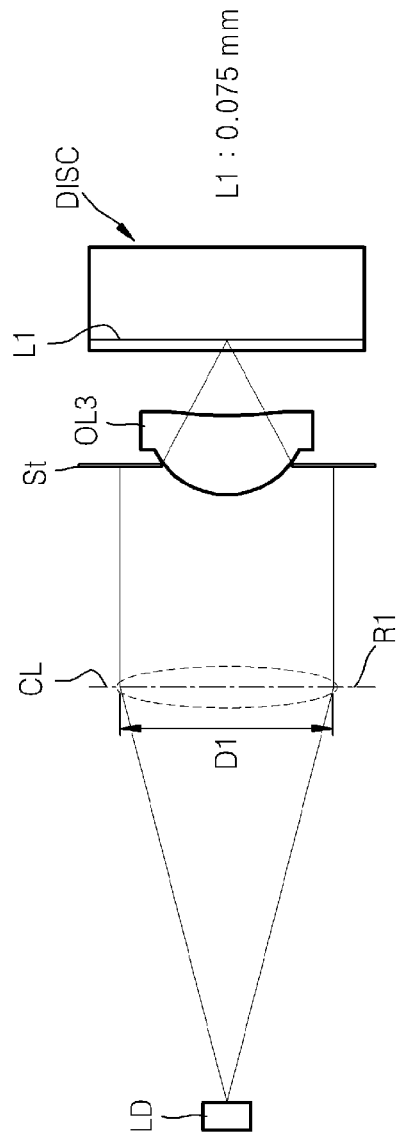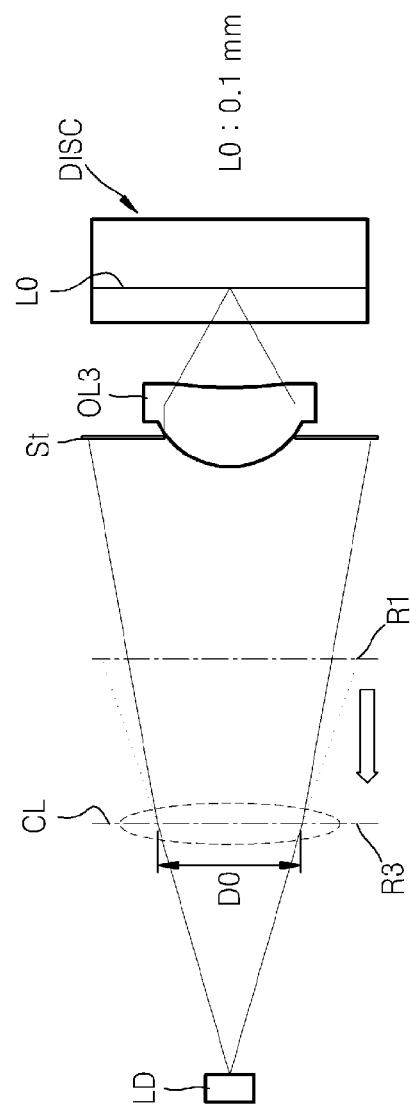

METHOD OF ACCESSING OPTICAL RECORDING MEDIA, OPTICAL PICKUP DEVICE, AND OPTICAL DRIVE USING THE DEVICE

CROSS-REFERENCE TO RELATED PATENT APPLICATION(S)

This application claims the benefit under 35 U.S.C. §119 (a) of Korean Patent Application No. 10-2009-0093217, filed on Sep. 30, 2009, in the Korean Intellectual Property Office, the entire disclosure of which is incorporated herein by reference for all purposes.

BACKGROUND

1. Field

The following description relates to a method of accessing optical recording media, and in particular, a method of accessing optical recording media having a multilayer structure, an optical pickup device, and an optical drive using the device.

2. Description of the Related Art

An optical pickup device corresponding to multimedia may be applied to, for example, compact discs (CDs), digital versatile discs (DVDs) and Blu-ray Discs (BDs).

In general, an optical system of an optical pickup device corresponding to multimedia may include an object lens corresponding to CDs/DVDs and an object lens corresponding to BDs, and may further include a beam splitter, a collimator and a mirror. According to structural characteristics of an optical system, an optical system corresponding to CDs/DVDs may have an optical length different from that of an optical system corresponding to BDs, and thus a total optical length required to integrate a plurality of optical systems in one structure has to be ensured to appropriately focus light.

Accordingly, in a conventional optical pickup device corresponding to multimedia, an independent optical system corresponding to CDs/DVDs and an independent optical system corresponding to BDs are simply combined into one structure.

While CDs have one recording layer, DVDs and BDs are each divided into a single layer (SL) type having one recording layer and a dual layer (DL) type having two recording layers.

An optical pickup device applied to these optical recording media has an optical structure corresponding to a DL structure. Conventionally, an object lens optimized for a lower recording layer L0 at a substrate side, or an intermediate layer between the lower recording layer L0 and an upper recording layer L1, is used, and an optical length caused by a difference in position or height of the lower and upper recording layers L0 and L1 may be compensated by shifting a collimator lens disposed behind the object lens along an optical axis. A maximum size of the collimator lens is determined according to the design of the object lens. A maximum effective diameter of the collimator lens, which is used when a beam spot is focused on the upper recording layer L1 may present a problem when forming a small and slip optical pickup device to be used in a notebook computer or a portable ODD.

SUMMARY

In one general aspect, there is provided a method of accessing optical recording media. The method includes providing an optical recording medium having a multilayer structure comprising lower and upper recording layers formed on a substrate, providing an optical pickup device comprising an object lens having optical characteristics optimized for the upper recording layer of the optical recording medium, a light source for irradiating light toward the optical recording medium through the object lens, and a collimator lens disposed between the object lens and the light source, and disposing the optical pickup device at a position that allows optical access to the optical recording medium.

The disposing of the optical pickup device may include setting an initial position of the object lens such that an initial focus position of the object lens corresponds to the upper recording layer, setting a focus position of the object lens on the lower recording layer when the lower recording layer is accessed, and setting the object lens at the initial focus position when the upper recording layer is accessed.

The optical recording medium may be a Blu-ray Disc (BD).

The optical recording medium may include four recording layers.

The object lens may be optimized for a second recording layer from the substrate from among the four recording layers.

In another aspect, there is provided an optical pickup device including an object lens corresponding to an optical recording medium, the optical recording medium having a multilayer structure comprising at least lower and upper recording layers formed on a substrate, and optically optimized for the upper recording layer of the optical recording medium, a light source for irradiating light toward the optical recording medium through the object lens, and a collimator lens disposed between the object lens and the light source.

The optical recording medium may be a dual layer (DL) optical recording medium.

The optical recording medium may be a Blu-ray Disc (BD).

The collimator lens may be configured to reduce a divergence angle of the divergent light from the light source, at a second position different from the first position.

The collimator lens may be configured to reduce a divergence angle of the divergent light from the light source, at a second position different from the first position.

The optical recording medium may include four recording layers sequentially formed on the substrate, and the object lens may be optimized for a second recording layer from the substrate.

In yet another aspect, there is provided an optical drive including an optical pickup device corresponding to an optical recording medium, the optical recording medium having a multilayer structure comprising at least lower and upper recording layers formed on a substrate, wherein the optical pickup device includes an object lens optically optimized for the upper recording layer of the optical recording medium, a light source configured to irradiate light toward the optical recording medium through the object lens, and a collimator lens disposed between the object lens and the light source.

Other features and aspects may be apparent from the following detailed description, the drawings, and the claims.

BRIEF DESCRIPTION OF THE DRAWINGS

FIG. 2 is an optical structural view illustrating an example of differences in focus optimized for an optical recording medium such as a Blu-ray Disc (BD) between conventional object lenses and an object lens.

FIGS. 3A and 3B are cross-sectional views illustrating a conventional optical system using an object lens optimized for a lower recording layer.

FIGS. 5A and 5B are cross-sectional views illustrating an example of an optical system using an object lens optimized for an upper recording layer.

Figure 1:
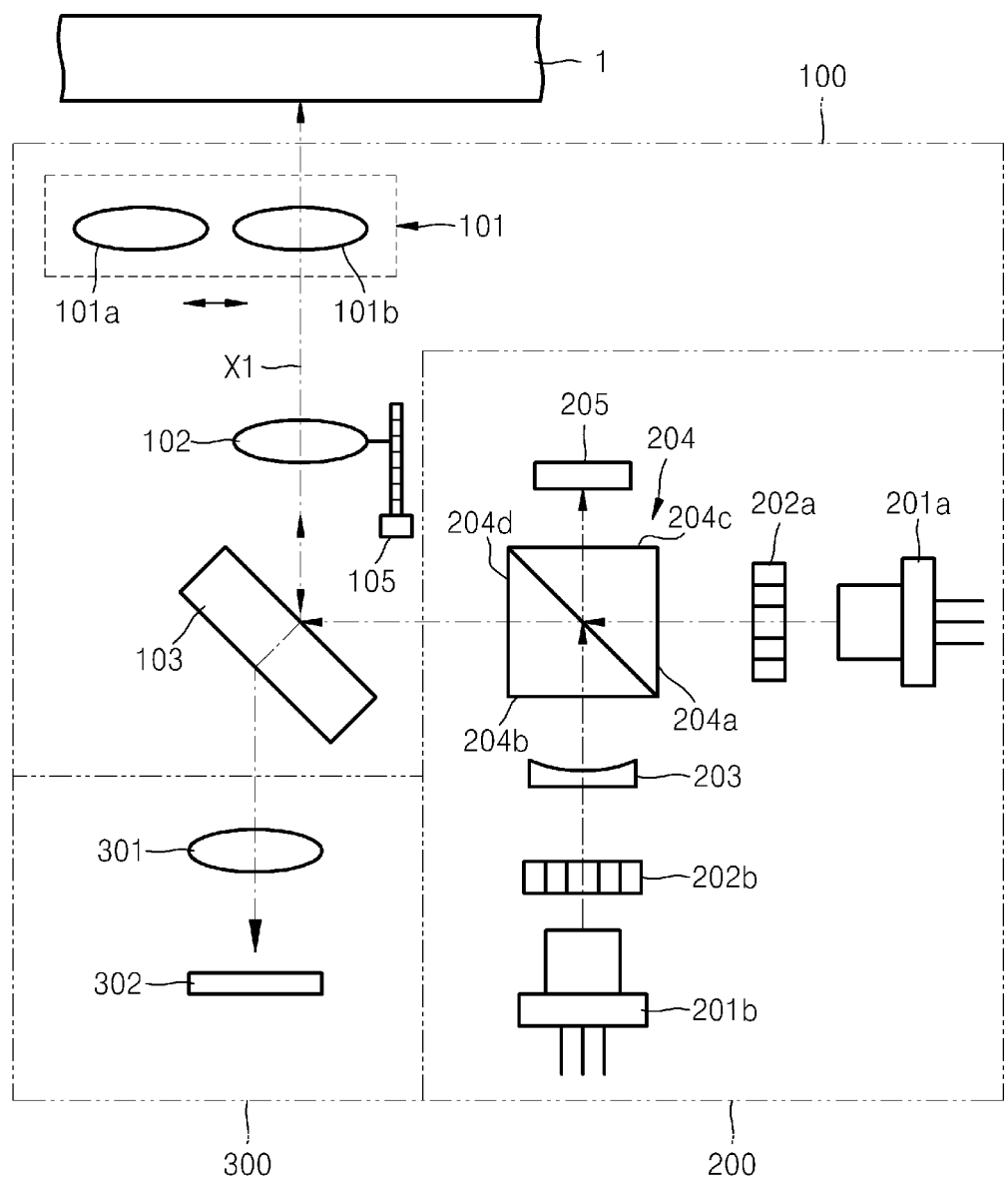
FIG. 1 is an optical structural view illustrating an example of an optical pickup device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

As further explained below, optical recording media may have a multilayer structure having at least two recording layers. An optical pickup device of the present disclosure is compatible with a single layer (SL) optical recording medium having one recording layer as well as a dual layer (DL) optical recording medium having two recording layers. In the following descriptions, a Blu-ray Disc (BD) and an optical pickup device that is compatible with the BD are described as representative examples of different types of optical recording media and optical pickup devices. Optical access may refer to an operation of forming an appropriate spot on a target recording layer of an optical recording medium by using a laser beam from a light source, and optically recording on or reading information from the target recording layer. In some ways, an optical access method may be regarded as a method of forming an appropriate beam spot on an optical recording medium.

FIG. 1 illustrates an example of an optical pickup device. The optical pickup device includes an optical transfer system 100 directly corresponding to an optical recording medium 1, a light transmission system 200 configured to provide light for reproducing information from and/or recording information on the optical recording medium 1, and a light reception system 300 configured to receive light reflected on the optical recording medium 1 and generate an electrical reproduction signal in order to reproduce information.

The optical transfer system 100 (also referred to as a focusing optical system) may be disposed on a transfer system optical axis X1, and include an object lens assembly 101 corresponding to the optical recording medium 1, a first beam splitter 103 having a plate-shaped structure, a collimator lens 102 disposed between the object lens assembly 101 and the first beam splitter 103, and a collimator lens transfer device 105 for controlling positioning of the collimator lens 102 on an optical axis. The object lens assembly 101 includes object lenses 101a and 101b corresponding to a plurality of media. For example, the object lens 101a may correspond to compact discs (CDs)/digital versatile discs (DVDs) and the object lens 101b may correspond to BDs. The object lens assembly 101 may move back and forth across the optical axis to dispose a corresponding object lens on the transfer system optical axis X1 according to a medium type.

The collimator lens 102 may move back and forth along the optical axis within a length range set by the collimator lens transfer device 105 so as to obtain an appropriate focal length according to a medium type. According to a standard BD having a DL structure, a lower recording layer is referred to as L0 and an upper recording layer is referred to as L1. An object lens of an optical pickup device that is compatible with optical recording media may be optimized for the lower recording layer L0 or an intermediate depth or position between the lower and upper recording layers L0 and L1, as shown in the conventional examples of FIGS. 3A, 3B, and 4A-4C, which are further discussed below. The present disclosure is directed to, among other things, an optical pickup that is optimized for an upper recording layer L1.

FIG. 2 illustrates an example of differences in focus optimized for an optical recording medium such as a BD between conventional object lenses and an object lens discussed in this disclosure.

Referring to the example illustrated in FIG. 2, the BD includes lower and upper recording layers L0 and L1. Cover glass (CG), for example, or a protective layer formed of another transparent material is formed between the lower and upper recording layers L0 and L1 and on the upper recording layer L1. As shown in the example of FIG. 2, the total thickness of the BD is 1.2 mm, the thickness of the CG with respect to the lower recording layer L0 (the depth from an outermost surface of the BD to the lower recording layer L0) is 0.1 mm, and the thickness of the CG with respect to the upper recording layer L1 (the depth from the outermost surface of the BD to the upper recording layer L1) is 0.075 mm.

With respect to the BD having a DL structure, a conventional object lens OL1 may be optimized for the lower recording layer L0, and a conventional object lens OL2 may be optimized for an intermediate depth or position between the lower and upper recording layers L0 and L1 (CG=0.0875 mm). However, an object lens OL3 described in the instant disclosure is optimized for the upper recording layer L1 (CG=0.075 mm). The object lenses OL1, OL2, and OL3 are designed with respect to a blue-based wavelength of 405 nm and have a numerical aperture (NA) of 0.85. In general, a laser beam from a light source is parallel to a collimator lens at an optimized position, and diverges or converges at other positions when the position of the collimator lens is changed. The variation of a laser beam flux according to the position of a collimator lens is further described below. In the following descriptions, the amount of "CG" may represent the depth from a surface of an optical recording medium to a corresponding recording layer. For example, if CG=0.075 mm with respect to the lower recording layer L0, 0.075 mm represents the depth from a surface of an optical recording medium to the lower recording layer L0 or the thickness of a protective material, e.g., CG, for covering the lower recording layer L0.

As described in the examples above, the object lens OL3, which is optimized for the upper recording layer L1, may allow an optical pickup device to have a smaller size by reducing a maximum effective diameter of a collimator lens in the optical pickup device. That is, a maximum size of a collimator lens, which may cause a problem in forming a small optical pickup device, may be reduced. For this, an object lens, which is referred to in designing a collimator lens, is optimized for the upper recording layer L1 of an optical recording medium.

FIGS. 3A and 3B illustrate an example of a conventional optical system using an object lens OL1 optimized for a lower recording layer L0. That is, light irradiated from the light source LD is changed into parallel or converged light by collimator lens CL to be incident on the object lens to form a focus on the lower recording layer.

FIGS. 3A and 3B show a variation in size of an effective diameter of a collimator lens CL and a variation in position of the collimator lens CL when a focus is formed (or optical access is performed) on the lower recording layer L0 and an upper recording layer L1, and a beam flux according to the variations.

As illustrated in the examples of FIGS. 3A and 3B, the physical length between a light source LD and an optical recording medium DISC is fixed. The focus position of the object lens OL1 may be determined for the lower and upper recording layers L0 and L1 according to the position of the collimator lens CL. As illustrated in FIG. 3A, when a focus is formed on the lower recording layer L0 of the optical recording medium DISC, light irradiated from the light source LD is changed into parallel light by the collimator lens CL disposed at a first position R1 on an optical axis, and then is incident on the object lens OL1 through a stop St. In one example, a light incident region on the collimator lens CL has a predetermined effective diameter D0. The stop St removes unnecessary ambient light, i.e., an ambient component of the beam flux that is incident on the object lens OL1.

As illustrated in FIG. 3B, when a focus is formed on the upper recording layer L1 of the optical recording medium DISC, the collimator lens CL gets closer to the optical recording medium DISC and is disposed at a second position R2. In one example, the light incident region from the light source LD on the collimator lens CL has an increased effective diameter D1. The beam flux that passes through the collimator lens CL converges and is incident on the object lens OL1. Accordingly, the collimator lens CL has a maximum effective diameter when a focus is formed on the upper recording layer L1 and is thus designed to have a size corresponding to the upper recording layer L1.

As such, the object lens OL1 may be optimized for the lower recording layer L0 and the collimator lens CL may be designed to have a size corresponding to the upper recording layer L1. However, this may cause a problem in forming a small and slim optical pickup device. That is, although an optical pickup device used in a half height (H/H) optical drive is not required to have a small size, in a small and slim optical drive having a total height equal to or less than 9.5 mm, if the object lens OL1 is optimized for the lower recording layer L0 and the collimator lens CL is designed to correspond to the upper recording layer L1, the size of the collimator lens CL may be a problem in forming a small optical pickup device.

Figure 4A:
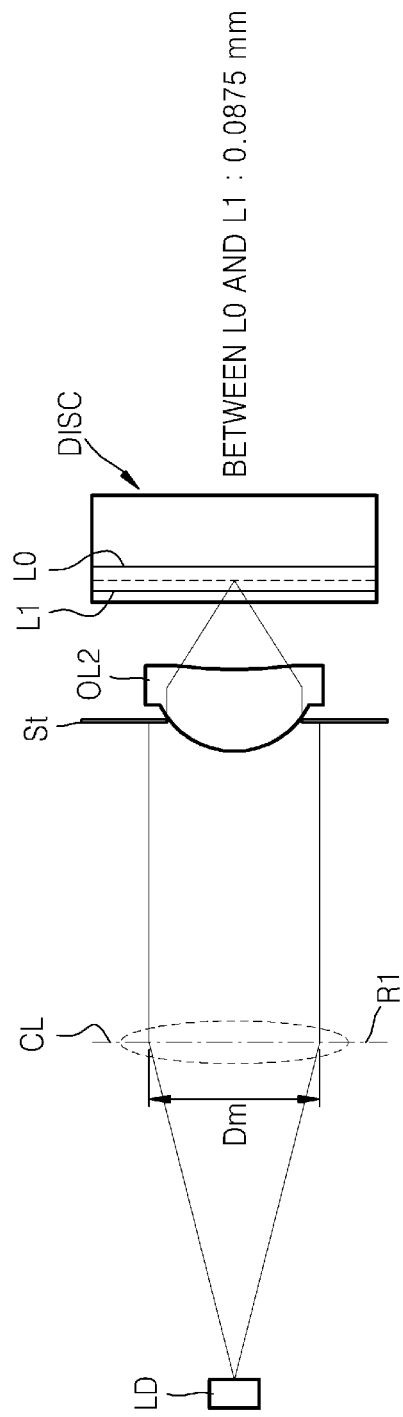
FIGS. 4A through 4C are cross-sectional views illustrating another conventional optical system using an object lens optimized for an intermediate layer between lower and upper recording layers.
Figure 4B:
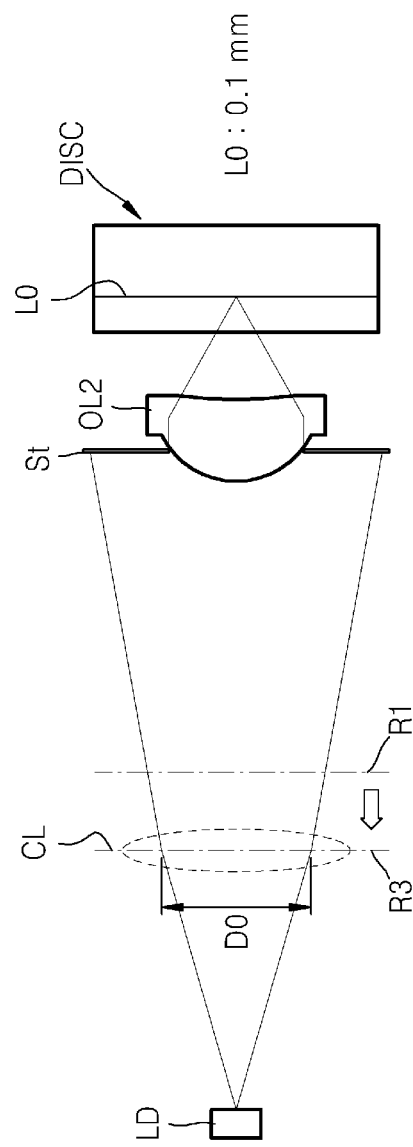
Figure 4C:
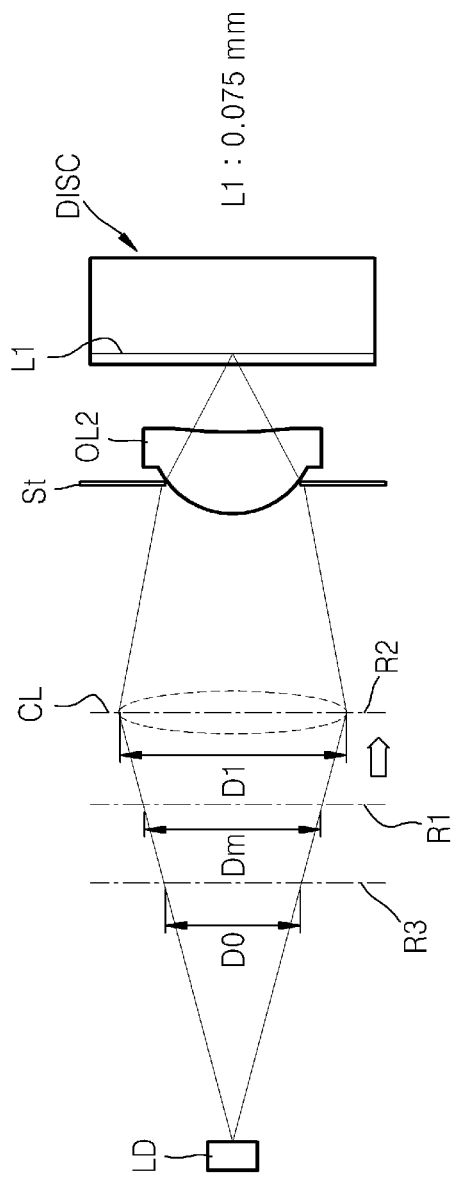
Figure 6:
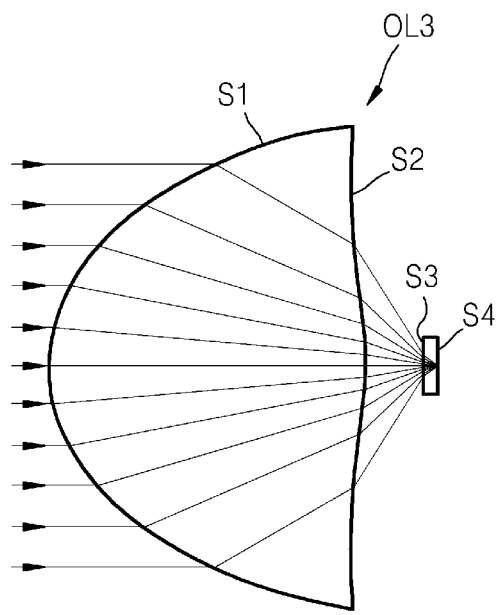
FIG. 6 is a cross-sectional view illustrating an example of an object lens.

FIGS. 4A through 4C are cross-sectional views of another conventional optical system using an object lens OL2 optimized for an intermediate layer between lower and upper recording layers L0 and L1. That is, light irradiated from the light source LD is changed into parallel light by collimator lens CL to be incident on the object lens to form a focus on the intermediate layer. FIG. 4A shows an effective diameter Dm of a collimator lens CL and a beam flux when a focus is formed on the intermediate layer between the lower and upper recording layers L0 and L1, for which the object lens OL2 is optimized. As illustrated in FIG. 4A, divergent light from a light source LD passes through the collimator lens CL disposed at a first position R1, i.e., a reference position, and then proceeds toward the object lens OL2 through a stop St in the form of parallel light. In one example, a light incident region of the collimator lens CL has the effective diameter Dm, which is middle-sized.

As illustrated in the example of FIG. 4B, when a focus is formed on the lower recording layer L0 of an optical recording medium DISC, the collimator lens CL retreats backward from the first position R1 to a third position R3 so as to move away from the object lens OL2. Accordingly, in one example, the light incident region of the collimator lens CL has an effective diameter D0 that is smaller than the effective diameter Dm of the collimator lens CL at the reference position. Meanwhile, as illustrated in the example of FIG. 4C, when a focus is formed on the upper recording layer L1 of the optical recording medium DISC, the collimator lens CL proceeds from the reference position toward the object lens OL2 so as to be disposed at a second position R2. Accordingly, in one example, the light incident region of the collimator lens CL has an effective diameter D1 that is larger than the effective diameter Dm of the collimator lens CL at the reference position. Accordingly, a maximum size of the collimator lens CL is larger than the size of the collimator lens CL at the reference position, which still may cause a problem in designing a small and slim optical pickup device. That is, the size of the collimator lens CL is determined so that it may accommodate a light incident region with the largest diameter. The largest light incident region occurs when the collimator lens is position nearest the object lens, as shown in FIG. 4C, for example. With the collimator lens in this position, the light converges to be incident on the object lens, and thus, the object lens is not optimized for the layer on which the focus is formed.

FIGS. 5A and 5B illustrate examples of an optical system using an object lens OL3 optimized for an upper recording layer L1.

As illustrated in the examples FIGS. 5A and 5B, the object lens OL3 is shown as being optimized for the upper recording layer L1 of an optical recording medium DISC, and a collimator lens CL is designed to have a size corresponding to the upper recording layer L1 of the optical recording medium DISC. Accordingly, as illustrated in FIG. 5A, when a focus is formed on the upper recording layer L1, the collimator lens CL is disposed at a reference position, i.e., a first position R1, and changes divergent light from a light source LD into parallel light, allowing the parallel light to be incident on the object lens OL3 through a stop St. In one example, the collimator lens CL has an effective diameter D1.

Meanwhile, as illustrated in the example of FIG. 5B, when a focus is formed on a lower recording layer L0, the collimator lens CL retreats toward the light source LD, is disposed at a third position R3, and thus has an effective diameter D0 that is smaller than the effective diameter D1. In one example, although a divergence angle of the divergent light from the light source LD is reduced as the divergent light passes through the collimator lens CL, the divergent light still diverges to be incident on the object lens OL3. According to the above-described structure, the collimator lens CL is designed to have a size appropriate for the object lens OL3 optimized for the upper recording layer L1. Accordingly, an optical pickup device including the object lens OL3 and the collimator lens CL, which are optimized for the upper recording layer L1, may have a smaller size.

An example of a focus forming method of an optical pickup device including the object lens OL3 is described below.

An optical recording medium, for example, a BD, having a multilayer structure including at least lower and upper recording layers L0 and L1 is prepared.

An optical pickup device including an object lens having optical characteristics optimized for the upper recording layer L1 of the optical recording medium, a light source for irradiating light toward the optical recording medium through the object lens, and a collimator lens disposed between the object lens and the light source, is prepared. The optical pickup device may have the optical structure illustrated in FIG. 1, for example.

The optical pickup device may be disposed at a position that allows optical access to the optical recording medium. For example, the optical recording medium may be loaded and then the optical pickup device may be positioned with respect to the optical recording medium. In one example, when the optical pickup device is positioned, an initial position of the object lens is determined such that an initial focus position of the object lens corresponds to the upper recording layer L1. As such, the upper recording layer L1 may be immediately accessible when the optical recording medium is initially loaded.

Meanwhile, a focus position of the object lens when the lower recording layer L0 is accessed may be determined as the lower recording layer L0. In one example, the collimator lens is shifted and a focusing control structure for supporting the object lens minutely adjusts the object lens to form a focus on the lower recording layer L0.

Then, when the upper recording layer L1 is accessed, the collimator lens is shifted to its initial position and the object lens is set at the initial focus position.

According to the above-described examples, when an optical pickup device corresponding to an optical recording medium having a DL structure is designed, if an object lens is optimized for an upper recording layer for determining a maximum size of a collimator lens, the collimator lens may be controlled to have a desired size. In the optical pickup device, the collimator lens allows a beam flux proceeding toward the object lens to converge, such that the beam flux is incident on the object lens in the form of non-divergent light, i.e., parallel, or convergent light.

Figure 7:
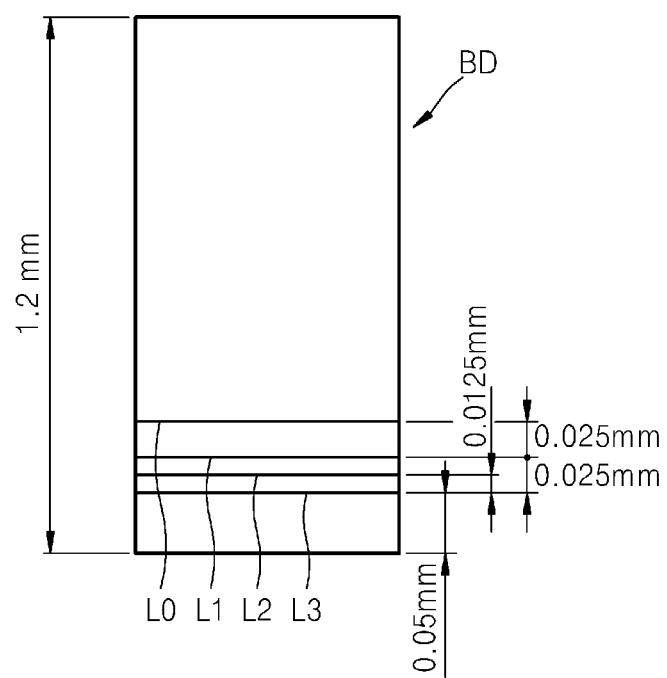
FIG. 7 is a cross-sectional view illustrating an example of the depth of each recording layer of a quadruple layer (QL) optical recording medium to be accessed by an optical pickup device.

Table 1 shows an example of data for designing an object lens used in an optical pickup device, optimized for an upper recording layer L1 when CG=0.075 mm. FIG. 7 illustrates an example of an optical recording medium to be accessed by using the above object lens.

TABLE 1

|    | RDY | THICKNESS | GLASS | REMARK |
|----|-----|-----------|-------|--------|
|    | INFINITY | INFINITY | | |
|    | INFINITY | | | |
| S1 | 0.78911 | 1.570000 | | 'ZEONIX' |
|    | ASP: | | | |
|    | K: −0.723647 | | | |
|    | IC: YES | CUF: 0.000000 | | |
|    | A: 0.820614E−01 | B: 0.302953E−01 | C: 0.403731E−02 | |
|    | D: 0.681338E−01 | E: −.805895E−01 | F: 0.374595E−01 | |
| S2 | −0.95832 | 0.000000 | | |
|    | ASP: | | | |
|    | K: −46.949481 | | | |
|    | IC: YES | CUF: 0.000000 | | |
|    | A: 0.667054E−01 | B: 0.389404E−01 | C: −.924591E−01 | |
|    | D: 0.383626E−01 | | | |

TABLE 1-continued

|    | RDY | THICKNESS | GLASS | REMARK |
|----|-----|-----------|-------|--------|
|    | INFINITY | INFINITY | | |
|    | INFINITY | | | |
| S3 | INFINITY | 0.290000 | AIR | |
| S4 | INFINITY | 0.075000 | 'P-CARBO' | |
|    | INFINITY | 0.000000 | | |
| IMG | INFINITY | 0.000000 | | |

Meanwhile, if an object lens optimized for a second, or upper, recording layer from a substrate, i.e., L1, is used, compatibility with an optical recording medium having a quadruple layer (QL) structure as illustrated in FIG. 7 may be obtained.

As illustrated in FIG. 7, for example, the QL optical recording medium sequentially includes four recording layers referred to as L0, L1, L2, and L3 from the substrate. For example, according to the standard of a BD, the total thickness of the optical recording medium is 1.2 mm, CG=0.1 mm with respect to L0, and CG=0.075 mm with respect to L1. Tentatively, CG=0.05 mm with respect to L3 and CG=0.0625 mm with respect to L2 and L3. An optical pickup device corresponding to the QL structure includes an object lens optimized for L1, and a collimator lens having a size corresponding to L3. The optical recording medium may have four or more recording layers.

The above-described object lens may be used to form an optical pickup device that is compatible with various optical recording media such as SL, DL, and QL optical recording media. In particular, an optical pickup device compatible with a DL optical recording medium may be appropriate to have a slim size.

A number of examples have been described above. Nevertheless, it will be understood that various modifications may be made. For example, suitable results may be achieved if the described techniques are performed in a different order and/or if components in a described system, architecture, device or circuit are combined in a different manner and/or replaced or supplemented by other components or their equivalents. Accordingly, other implementations are within the scope of the following claims.

What is claimed is:

1. A method of accessing optical recording media, the method comprising:
providing an optical recording medium comprising a multilayer structure formed on a substrate, the multilayer structure comprising a lowermost recording layer formed closest to the substrate and an uppermost recording layer formed farthest from the substrate;
providing an optical pickup device comprising:
an object lens comprising optical characteristics optimized for a focal recording layer, which is a recording layer of the multilayer structure other than the lowermost recording layer;
a light source for irradiating light toward the optical recording medium through the object lens; and
a collimator lens disposed between the object lens and the light source; and
disposing the optical pickup device at a position that allows optical access to the optical recording medium.

2. The method of claim 1, wherein the disposing of the optical pickup device comprises:
setting an initial position of the object lens such that an initial focus position of the object lens corresponds to the focal recording layer;

setting a focus position of the object lens on the lowermost recording layer when the lowermost recording layer is accessed; and setting the object lens at the initial focus position when the focal recording layer is accessed.

3. The method of claim 1, wherein the optical recording medium comprises a Blu-ray Disc (BD).

4. The method of claim 1, wherein the optical recording medium comprises four recording layers.

5. The method of claim 4, wherein the focal recording layer is a second recording layer from the substrate from among the four recording layers.

6. An optical pickup device, comprising:

an object lens corresponding to an optical recording medium, the optical recording medium comprising a multilayer structure formed on a substrate, the multilayer structure comprising a lowermost recording layer formed closest to the substrate and an uppermost recording layer formed farthest from the substrate, the object lens optically optimized for a focal recording layer, which is a recording layer of the multilayer structure other than the lowermost recording layer;

a light source configured to irradiate light toward the optical recording medium through the object lens; and a collimator lens disposed between the object lens and the light source.

7. The device of claim 6, wherein the optical recording medium comprises a dual layer (DL) optical recording medium.

8. The device of claim 6, wherein the optical recording medium comprises a Blu-ray Disc (BD).

9. The device of claim 7, wherein the DL optical recording medium comprises a BD.

10. The device of claim 6, wherein the collimator lens is configured to change divergent light from the light source, into convergent light at a first position.

11. The device of claim 7, wherein the collimator lens is configured to change divergent light from the light source, into convergent light at a first position.

12. The device of claim 10, wherein the collimator lens is configured to reduce a divergence angle of the divergent light from the light source, at a second position different from the first position.

13. The device of claim 11, wherein the collimator lens is configured to reduce a divergence angle of the divergent light from the light source, at a second position different from the first position.

14. The device of claim 6, wherein:

the optical recording medium comprises four recording layers sequentially formed on the substrate; and the focal recording layer is a second recording layer from the substrate.

15. The device of claim 7, wherein:

the optical recording medium comprises four recording layers sequentially formed on the substrate; and the focal recording layer is a second recording layer from the substrate.

16. An optical drive comprising an optical pickup device corresponding to an optical recording medium, the optical recording medium comprising a multilayer structure formed on a substrate, the multilayer structure comprising a lowermost recording layer formed closest to the substrate and an uppermost recording layer formed farthest from the substrate, the optical pickup device comprising:

an object lens optically optimized, at a first position, for a focal recording layer, which is a recording layer of the multilayer structure other than the lowermost recording layer;

a light source configured to irradiate light toward the optical recording medium through the object lens; and a collimator lens disposed between the object lens and the light source.

17. The drive of claim 16, wherein the optical recording medium comprises a Blu-ray Disc (BD).

18. The drive of claim 16, wherein the collimator lens is configured to reduce a divergence angle of divergent light from the light source, at a second position different from the first position.

19. The drive of claim 16, wherein:

the optical recording medium comprises four recording layers sequentially formed on the substrate; and the focal recording layer is a second recording layer from the substrate.

* * * * *